Figure 1:
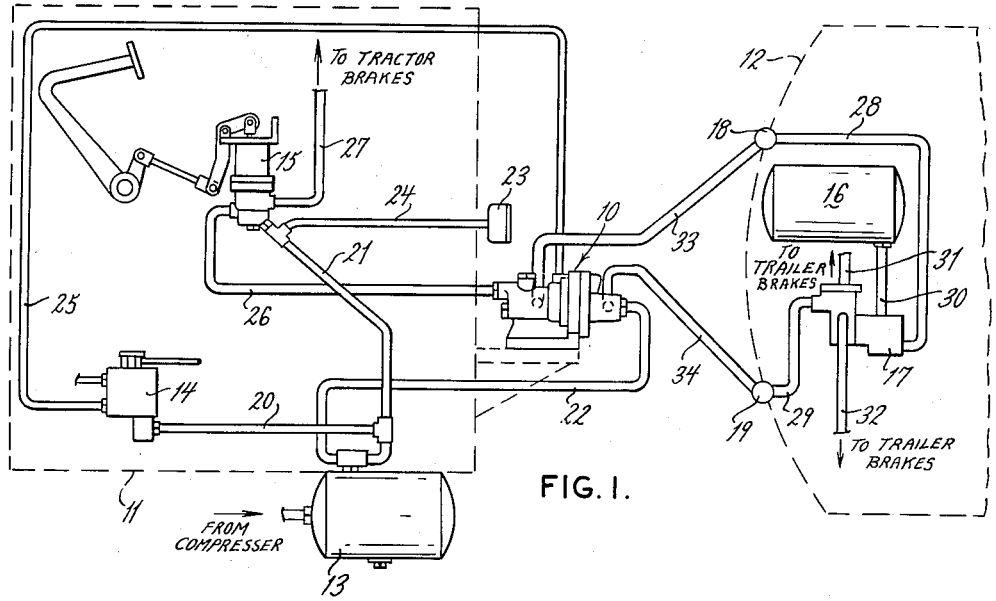

June 5, 1956   W. R. FREEMAN   2,748,791
EMERGENCY BREAK-AWAY VALVE
Filed May 5, 1952   2 Sheets-Sheet 1

INVENTOR.
WALTER R. FREEMAN
BY Gravely, Lieder,
Woodruff & Gees
ATTORNEYS

INVENTOR.
WALTER R. FREEMAN

United States Patent Office 2,748,791
Patented June 5, 1956

2,748,791

EMERGENCY BREAK-AWAY VALVE

Walter R. Freeman, University City, Mo., assignor to Wagner Electric Corporation, St. Louis, Mo., a corporation of Delaware Application May 5, 1952, Serial No. 286,218

18 Claims. (Cl. 137—111)

The present invention relates generally to tractor-trailer braking systems, and more particularly to a novel emergency break-away valve for preserving a predetermined minimum pressure in the tractor braking system under both normal and emergency conditions as occur in the pressure lines between the tractor and the trailer.

In the conventional tractor-trailer braking system there is an emergency line and a service line between the tractor and the trailer, the emergency line serving as a conduit between the tractor supply tank and the trailer reservoir, and the service line serving as a means for applying the trailer brakes during normal operation. During the normal operation of coupling and uncoupling the tractor and trailer while they are stationary, both the emergency line and the service line are disconnected. Also, while the tractor and trailer are in motion, at times either the emergency line or the service line may develop a leak while at other times, either or both lines may be accidentally broken apart.

It is an object of the present invention therefore, to provide a novel emergency break-away valve for preserving a predetermined minimum fluid pressure in the tractor braking system upon a leakage or breakage occurring in either or both the emergency line and the service line. More particularly, it is an object to provide such a valve for automatically closing off the emergency line and the service line to the trailer when the pressure in the emergency line or in the tractor supply tank drops below a predetermined value, as when a leakage or breakage occurs in either the emergency line or the service line, or when the trailer is intentionally uncoupled from the tractor when they are motionless.

Another object is to provide a novel emergency break-away valve which is automatically moved to the operative position by fluid pressure caused by the movement of manually operable means in the tractor cab which is common to known tractor-trailer braking systems. More particularly, it is an object to provide such a valve which is initially placed in operative position by fluid pressure caused by actuating the hand-control valve, so as to open the service and emergency line between the tractor and the trailer, and thereafter the hand-control valve can be used in the conventional manner for actuating the braking mechanism of the trailer. Specifically, it is an object to provide such a valve in which initial operation of the hand-control valve causes the opening of the emergency line between the tractor and the trailer and the setting of the trailer brakes, and subsequent exhausting of the hand-control valve releases the trailer brakes but maintains both the emergency and service lines open; and thereafter the hand-control valve can be operated to apply the trailer brakes in the conventional manner.

Another object is to provide certain improved features of mechanical construction whereby more perfect and dependable operation is secured and there is greater durability and a greater degree of mechanical perfection than has heretofore been obtained in emergency break-away valves.

Further objects and advantages of the present invention will be apparent from the following detailed description, reference being had to the accompanying drawings wherein preferred embodiments of the present invention are shown.

Briefly, the invention resides in providing an emergency valve assembly which is adapted to be placed in a braking system at the tractor end of the service and emergency lines, and which is automatically moved into operative position by actuating a valve member on the tractor whereby the tractor and trailer braking systems are operatively interconnected through the emergency and service lines, the valve assembly then being maintained in the operative position due primarily to the pressure in the tractor supply tank, and automatically operable to close off the service and emergency lines upon a predetermined decrease in pressure in either the emergency line or in the supply tank circuit, whereby a minimum operating pressure will always be maintained in the tractor braking system.

Figure 5:
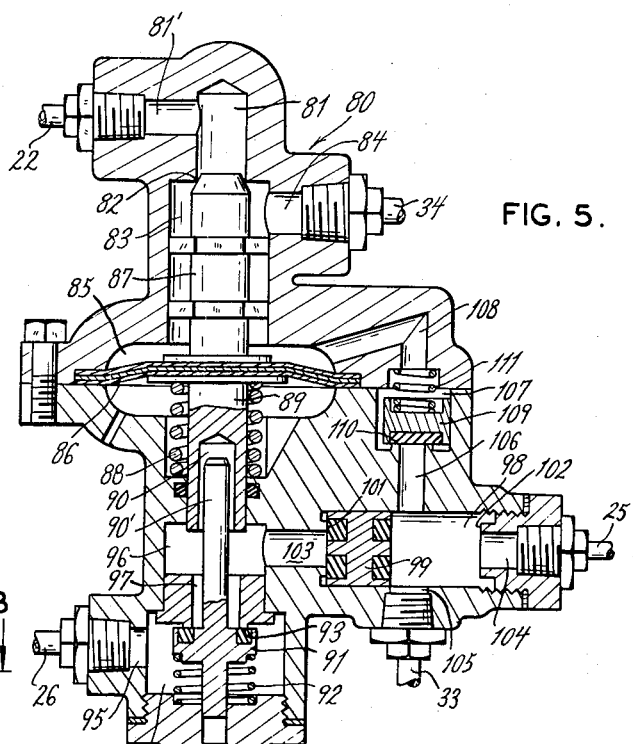
Figure 2:
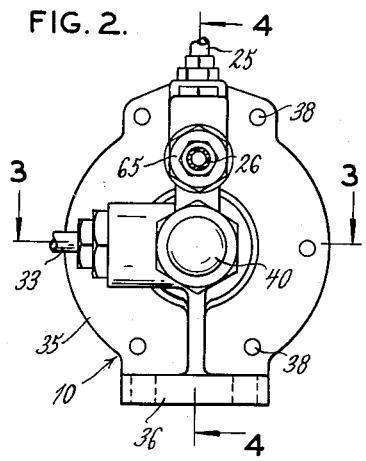
Figure 3:
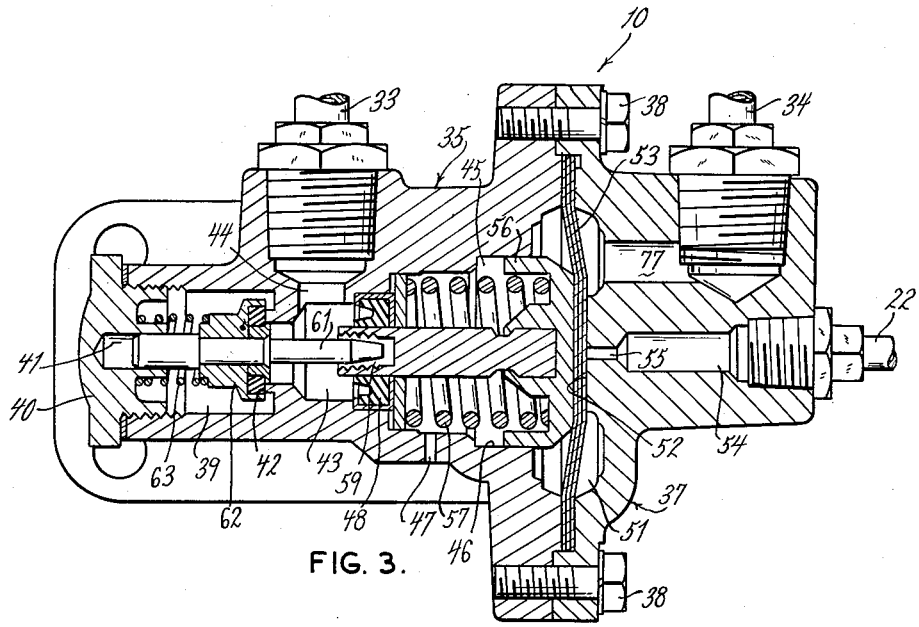
Figure 4:
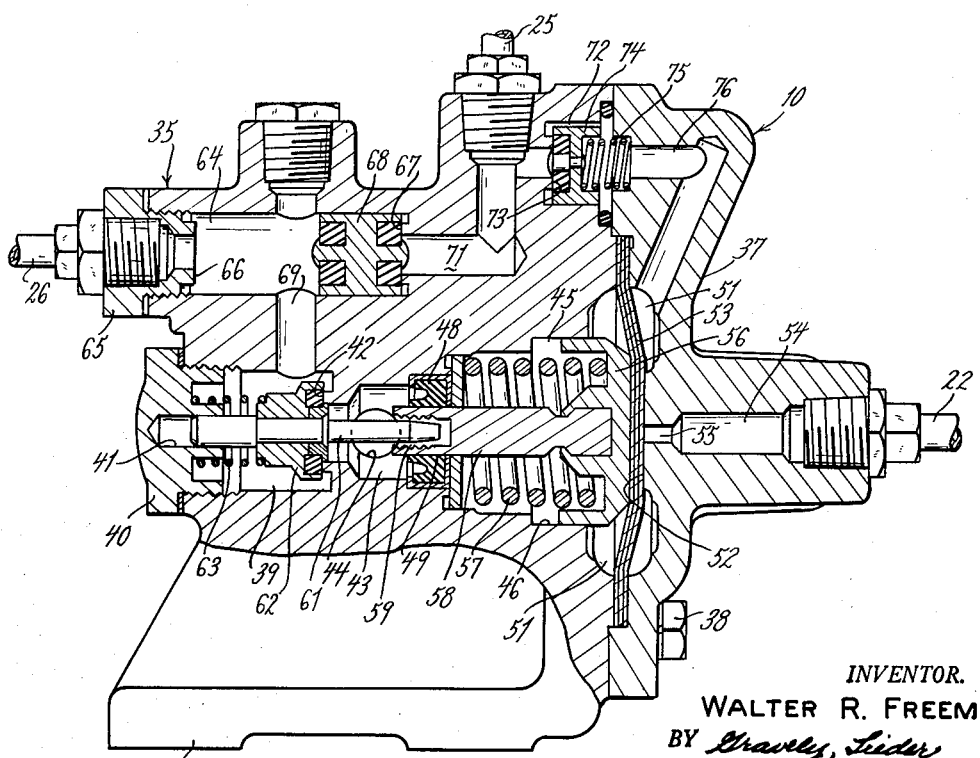

In the drawings:

Fig. 1 is a somewhat schematic view of a portion of a tractor-trailer braking system employing the preferred construction of the emergency break-away valve embodying the teachings of the present invention, Fig. 2 is an enlarged end view of the preferred valve construction shown in Fig. 1, taken from the left hand side, Fig. 3 is an enlarged horizontal longitudinal sectional view taken on the line 3—3 in Fig. 2, Fig. 4 is an enlarged vertical longitudinal sectional view taken on the line 4—4 in Fig. 2, and Fig. 5 is a vertical longitudinal sectional view of a modified valve construction embodying the teachings of the present invention.

Referring to the drawings more particularly by reference numerals, specifically Fig. 1, 10 indicates generally a preferred form of emergency break-away valve constructed according to the teachings of the present invention, shown positioned in the braking system between a tractor 11 and a trailer 12 (illustrated schematically).

The braking system includes a storage or supply tank 13, a hand valve 14, and a foot valve 15 mounted on the tractor 11; and a reservoir 16, an emergency relay valve 17, and two couplings 18 and 19 mounted on the trailer 12.

The storage or supply tank 13 is connected to the hand valve 14 through a conduit 20, to the foot valve 15 through a conduit 21, and to the emergency valve 10 through a conduit 22.

A pressure gauge 23 is connected to the conduit 21 through a conduit 24 so as to indicate the pressure in the storage tank 13.

A conduit 25 extends from the hand valve 14 and connects it with the emergency valve 10, and a conduit 26 extends from the foot valve 15 and connects the latter with the emergency valve 10; the foot valve 15 also being in communication with the tractor brakes (not shown) through a conduit 27.

On the trailer 12, the coupling 18 is connected to the emergency relay valve 17 through a conduit 28, and the coupling 19 is connected therewith through a conduit 29.

The trailer reservoir 16 and the emergency relay valve 17 are connected together by a conduit 30, and conduits 31 and 32 lead from the emergency relay valve 17 to the trailer brakes (not shown).

A service line 33 connects the emergency valve 10 with the coupling 18, and an emergency line 34 connects the valve 10 with the coupling 19.

As shown more particularly in Figs. 3 and 4, the emergency valve 10 includes a body member 35 which has a base portion 36, and a cap 37 removably fastened to the right hand end thereof by bolts 38.

The body member 35 contains an axial bore at the left side thereof which forms a first valve chamber 39, the outer end of the chamber being closed by a plug 40 which has a bore 41 formed therein. A valve seat 42 is provided at the right-hand end of the first valve chamber 39. In communication with the first valve chamber 39 and spaced axially inwardly therefrom is a conduit chamber 43 which is in communication with the service conduit 33 through a port 44.

To the right of the conduit chamber 43 there is a second valve chamber 45 which has a side wall 46, and which is in communication with the atmosphere through a vent port 47 (Fig. 3).

The conduit chamber 43 is separated from the second valve chamber 45 by a resilient sealing member 48 which has a circular passageway 49 extending therethrough.

The right hand end of the second valve chamber 45 is enlarged to form the left half of a diaphragm chamber 51, the right half of the diaphragm chamber being contained in the cap member 37. The right half of the diaphragm chamber 51 is annular in shape so as to provide a valve seat 52 adjacent the center thereof.

A diaphragm 53 extends transversely of the diaphragm chamber 51 and is held in position between the base portion 36 and the cap 37 by the bolts 38.

A conduit chamber 54 extends inwardly from the right hand end of the body member and is in communication with the conduit 22 from the storage tank, the inner end of the conduit chamber 54 being restricted as at 55, for a purpose to appear.

Mounted within the second valve chamber 45 is a piston-like member 56 in sliding contact with the wall 46, the right hand end of the piston member 56 being urged against the diaphragm 53 by a coil spring 57.

A shaft 58 is connected to the piston-like member 56 and extends leftwardly through the opening 49 in the sealing member 48, and into the conduit chamber 43, the left hand end of the shaft 58 containing an internally threaded cavity 59.

A valve rod 61 has the right end thereof loosely disposed in the cavity 59 and extends leftwardly through the valve chamber 39 and has its left hand end disposed in, and guided by the bore 41 in the plug 40. Mounted on the valve rod 61 is a valve member 62 which is yieldably biased towards the valve seat 42 by a coiled spring 63.

As shown more particularly in Fig. 4, a series of passageways extend across the upper portion of the valve body 35 and includes a third valve chamber 64 at the left side. The left hand end of this chamber contains a plug 65 with a passageway therethrough in communication with the conduit 26, the inner end of the plug 65 forming a valve seat 66. At the right hand end of the valve chamber 64 there is another valve seat 67, and slidably mounted within the chamber in sliding contact with the side wall thereof, is a valve member 68 which is adapted to seat against either the valve seat 66 or the valve seat 67, depending on the pressure conditions within the valve chamber 64, as will appear. A passageway 69 extends downwardly from adjacent the center of the third valve chamber so as to connect it with the first valve chamber 39.

Extending from the right hand end of the third valve chamber 64 (Fig. 4) is a passageway 71 which extends upwardly so as to be incommunication with the conduit 25, and thence rightwardly to a fourth valve chamber 72.

The left hand end of the fourth valve chamber 72 is provided with a valve seat 73 and mounted within the chamber is a check valve member 74 which is yieldably urged toward the valve seat 73 by a coiled spring 75.

Extending from the right hand end of the fourth valve chamber 72 is a passageway 76 which is in communication with the diaphragm chamber 51 to the right of the diaphragm 53.

As shown more particularly in Fig. 3, a passageway 77 extends rightwardly from the right side of the diaphragm chamber 51 to the port which receives the conduit 34, whereby the conduit 34 will be placed in communication with the conduit 22 whenever the diaphragm 53 is moved to the left, away from the valve seat 52.

*Operation*

Assuming that there is normal pressure in the tractor storage or supply tank 13, and that the trailer 12 is uncoupled from the tractor 11, the various parts of the valve 10 will be the positions shown in Figs. 3 and 4 and normal fluid pressure will exist in the conduit 22, and in the conduit passageway 54 and restricted portion 55 of the valve 10. Thus, there will be a small force on the diaphragm 53 caused by the fluid pressure in the restricted port 55 urging it toward the open position, but this force is not sufficient to overcome the force of the spring 57 so that the valve 52, 53 remains in the closed position.

Because the valve 62, 42 is closed, the foot valve 15 can be actuated to operate the tractor brakes (not shown) without any fluid being exhausted to the atmosphere through the valve 10. When the foot valve 15 is actuated under these conditions, the valve member 68 will be moved to the right against the valve seat 67 so as to prevent fluid from being applied to the valve member 74, and the valve 62, 42 will prevent fluid from passing to the service line.

To place the valve 10 in operation, the service line 33 and the emergency line 34 are connected to the couplings 18 and 19, respectively, and the hand valve 14 is actuated to admit fluid through the conduit 25 to the valve 10. Fluid entering the valve 10 through the conduit 25 passes into the passageway 71 and against the right hand end of the valve member 68 so as to move it to the valve seat 66. This admits the fluid to the first valve chamber 39, but, the valve 62, 42 being closed, prevents the passage of fluid into the conduit chamber 43.

The fluid entering the valve 10 through the conduit 25 also causes the check valve member 74 to move to the right against the action of its spring 75 so as to permit the fluid to flow into the passageway 76, and into the diaphragm chamber 51 to the right of the diaphragm 53.

From the diaphragm chamber 51 the fluid passes to the conduit passageway 77 and through the emergency line 34 and the conduit 29 to the emergency relay valve 17 on the trailer 12.

If the fluid pressure in the trailer reservoir 16 is less than that in the emergency line 34, the fluid will continue to flow from the relay valve 17 into the trailer reservoir 16 until the pressure is equalized.

At the same time that the fluid flows from the hand valve 14 through the diaphragm chamber 51 and the emergency line 34, the fluid pressure in the diaphragm chamber 51 to the right of the diaphragm 53 causes the latter to move to the left away from its valve seat 52 against the action of the spring 57. This connects the conduit 22 with the emergency line 34 through the conduit passage 54 and the diaphragm chamber 51, and causes the fluid to flow directly from the tractor supply tank 13, through the emergency line 34, and into the trailer reservoir 16.

When the valve 53, 52 is opened, the fluid pressure in the diaphragm chamber 51 to the right of the diaphragm 53 obtained from the tractor supply tank 13 through the conduit 22, is sufficient to maintain the valve 53, 52 in the open position regardless of the pressure obtained through the hand valve 14.

Thus, as soon as the valve 53, 52 is opened, the hand valve 14 can be turned to the exhaust position, whereupon the check valve member 74 will be closed against the valve seat 73 by its spring 75 and the pressure of the fluid. This prevents the escape of fluid from the valve 10 through the hand valve 14.

When the piston-like member 56 moves to the left under the action of the fluid pressure to the right of the diaphragm 53, as previously described, the shaft 58 contacts the right-hand end of the valve stem 61 so as to open the valve 62, 42 against the action of the spring 63. This places the service line 33 in communication with the third valve chamber 64 through the conduit chamber 43, the first valve chamber 39, and the passageway 69.

Thereafter, to apply the trailer brakes, the foot valve 15 is actuated so as to increase the fluid pressure in the conduit 26. This causes the valve member 68 to move to the right and seat against the valve seat 67, thus preventing the fluid from being exhausted to the atmosphere through the hand valve 14 and permitting the increased fluid pressure in the third valve chamber 64 to flow through the passageway 69, the first valve chamber 39, the conduit chamber 43, the port 44 and into the service line 33 and through the conduit 28 to the emergency relay valve 17.

The same braking result can also be obtained by actuating the hand valve 14, the fluid passing from the storage or supply tank 13, through the conduit 20, the hand valve 14, the conduit 25 and into the passageway 71 in the valve 10. This causes the valve member 68 to move to the left and seat against the valve seat 66 whereby the fluid can flow from the third valve chamber 64 to the emergency relay valve 17 in the same manner as just previously described.

Considering now what the operation would be under certain emergency conditions, assume first that both the service line 33 and the emergency line 34 are broken while the tractor-trailer is in motion.

As soon as the pressure in the emergency line 34 collapses, the emergency relay valve 17 on the trailer is actuated to apply the trailer brakes. At the same time, the pressure to the right of the diaphragm 53 will drop but will tend to be replenished from the tractor supply tank 13 through the conduit 22, the conduit chamber 54 and the restricted port 55. However, because the restriction 55 limits the amount of fluid which can pass from the supply tank 13 to the diaphragm chamber 51, the rupture of the emergency line 34, or a fast leak therein, will cause a collapse of the pressure in the diaphragm chamber 51 to the right of the diaphragm 53 so as to permit the latter to move to the right and seat on the valve seat 52 due to the action of the spring 57 bearing against the piston-like member 56. This closes off the conduit 22 from the tractor supply tank 13, thereby preventing the latter from being exhausted to the atmosphere.

When the piston-like member 56 and shaft 58 move to the right as previously described, they permit the valve stem 61 and valve member 62 to be moved to the right by the spring 63, thereby causing the valve member 62 to seat on its valve seat 42. This closes off the service line 33 from the third valve chamber 64 so that the foot valve 15 can be actuated to apply the tractor brakes without the fluid being exhausted to the atmosphere through the service line 33.

Assume next that only the service line 33 is broken, the emergency line 34 remaining intact. When this occurs, there is no immediate loss of fluid because the hand valve 14 and foot valve 15 are interposed between the supply tank 13 and the service line 33. However, as soon as the driver attempts to actuate the brakes, as by means of the foot valve 15, some of the fluid will be exhausted to the atmosphere through the broken service line 33, the fluid passing from the conduit 26, through the third valve chamber 64, the passageway 69, the first valve chamber 39, the conduit chamber 43, the passageway 44, and out through the broken service line 33.

Even though the pressure in the supply tank 13 is caused to drop by this loss of fluid through the broken service line 33, enough pressure will remain to provide adequate braking action for the tractor 11 although there would be no braking action whatsoever at the trailer wheels.

As the operator continues to use the foot valve 15, the pressure in the system will continue to drop because of the fluid lost through the broken service line until the spring 57 overcomes the reduced pressure in the right side of the diaphragm chamber 51 so as to cause the valve 53, 52 to close, which is accompanied by the closing of the valve 62, 42 thereby preserving the supply tank pressure.

Also, the closing of the valve 62, 42 closes off the service line 33 and stops the loss of fluid to the atmosphere, thereby permitting all of the remaining pressure in the tractor braking system to be applied to the tractor brakes.

In Fig. 5 is shown a modified valve 80 embodying the teachings of the present invention, the construction of which will now be very briefly described.

Adjacent the upper end of the valve 80 there is a bore 81 which is in communication with the conduit 22 through a passageway 82. At the lower end of the bore 81 there is a valve seat 82 formed by the intersection of the bore 81 and a valve plunger chamber 83 which is of slightly larger diameter. The valve plunger chamber 83 is in communication with the emergency line 34 through a passageway 84 adjacent the upper end thereof, and the lower end is in communication with a diaphragm chamber 85 which contains a diaphragm 86. Disposed in the valve plunger chamber 83 is a valve plunger 87 which rests freely on the diaphragm 86. The diaphragm 86 is urged upwardly by a spring 88 which surrounds a shaft 89 which abuts against the underside of the diaphragm 86. The lower end of the shaft 89 contains a cavity 90 which receives the upper end of a rod 90' on which is mounted a valve member 91. The valve member 91 is urged upwardly by a spring 92 toward a valve seat 93 adjacent the upper end of a valve chamber 94. The valve chamber 94 is in communication with the conduit 26 through a passageway 95, and with an intermediate chamber 96 through a passageway 97 disposed above the valve seat 93.

At the right hand side of the valve 80 there is a double check valve chamber 98 which contains a check valve member 99 mounted therein. The chamber 98 contains a valve seat 101 at the left-hand end thereof, and a valve seat 102 at the right-hand end. The chamber 98 is in communication at the left side thereof with the intermediate chamber 96 through a passageway 103, and at the right side with the conduit 25 through a passageway 104. Extending downwardly from the chamber 98 is a passageway 105 which communicates with the service line 33, and extending upwardly from the chamber 98 is a passageway 106 which connects with a check valve chamber 107 which has its upper end in communication with the diaphragm chamber 85 through a passageway 108. Disposed in the valve chamber 107 is a check valve member 109 which is urged downwardly toward a valve seat 110 by a spring 111.

To place the valve 80 in operation, the hand valve 14 is actuated to cause fluid to flow through the conduit 25 and into the double check valve chamber 98. This moves the valve member 99 to the left and permits the fluid to flow downwardly through the service line 33 to the emergency relay valve 17 on the trailer. This operation is slightly different from the operation of the valve 10 as previously described, because in the latter, this flow is blocked by the closed valve 62, 42. The fluid which flows upwardly through the passageway 106 unseats the check valve member 109 and flows into the diaphragm chamber 85 above the diaphragm 86, through the passageway 84, through the emergency line 34 and into the relay valve 17, substantially as previously described with respect to the operation of the valve 10.

The fluid pressure in the diaphragm chamber 85 above the diaphragm 86 also forces the diaphragm 86 downwardly against the action of the spring 88. This permits the valve plunger 87 to move downwardly due to the force of gravity and the pressure in the bore 81 above the upper end of the plunger 87, thereby placing the conduit 22 from the supply tank 13 in communication with the emergency line 34. As in the operation of the valve 10, once the valve 87, 82 is opened, it remains open due to the pressure directly from the supply tank 13, regardless of the position of the hand valve 14. Thus, as soon as the valve plunger 87 moves downwardly, the hand valve 14 can be moved to the exhaust position thereby causing the check valve 109, 110 to close and prevent the escape of fluid from the diaphragm chamber 85 above the diaphragm 86.

When the shaft 89 is moved downwardly by the diaphragm 86 it causes the valve 91, 93 to be opened and to connect the service line 33 with the valve chamber 94. Thereafter, when the foot valve 15 is operated, the check valve 99 is moved to the right against the valve seat 102 and the fluid can flow into the service line 33.

As in the operation of the valve 10, if the emergency line 34 is broken, the pressure above the diaphragm 86 will collapse and permit the spring 88 to close the valve 87, 82 and the spring 92 to close the valve 91, 93, thereby preventing the loss of the fluid from the system.

Also, if only the service line 33 is broken, the pressure in the system will drop each time the operator actuates the foot valve 15 until the pressure in the supply tank 13 drops sufficiently to permit the spring 88 to close the valve 87, 82 against the action of the pressure above the diaphragm 86.

Thus, it is apparent that there has been provided a novel emergency break-away valve which fulfills all of the objects and advantages thought therefor. The valve is initially placed in operative position by fluid pressure caused by actuating a valve member which is presently being used in known braking systems. As soon as the valve has moved into operative position, the valve member can be released and the valve will be maintained in the operative position due to the pressure in the supply tank system, and both the tractor and the trailer brakes can be actuated in the usual manner.

However, when the emergency line between the tractor and the trailer is broken, or develops a fast leak, the valve will be automatically immediately closed to prevent the loss of fluid from the system and to permit the operator to use the tractor brakes. If the service line breaks or develops a fast leak, the valve automatically closes to maintain a predetermined minimum pressure in the tractor braking system to assure the satisfactory operation of the tractor brakes at all times.

It is to be understood that the foregoing description and the accompanying drawings have been given only by way of illustration and example, and that changes and alterations in the present disclosure, which will be readily apparent to one skilled in the art, are contemplated as within the scope of the present invention which is limited only by the claims which follow.

What is claimed is:

1. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; a second valve chamber in the housing containing second valve means therein for controlling the flow of fluid therethrough and movable between an open and a closed position, said second valve means being responsive to the movement of the pressure responsive member; means yieldably biasing the first and second valve means toward the closed position; an inlet port in the housing; a passageway from the inlet port to said one side of the pressure responsive member; and a check valve in said passageway permitting the flow of fluid from said inlet port to said one side of the pressure responsive member but preventing the reverse flow thereof.

2. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; a second valve chamber in the housing containing second valve means therein for controlling the flow of fluid therethrough and movable between an open and a closed position, said second valve means being responsive to the movement of the pressure responsive member; means yieldably biasing the first and second valve means toward the closed position; an auxiliary chamber in the housing and an inlet port leading thereto; a passage from the auxiliary chamber to said one side of the pressure responsive member; a check valve in said passageway permitting the flow of fluid from the auxiliary chamber to said one side of the pressure responsive member but preventing the reverse flow thereof; and passage means between the second valve chamber and the auxiliary chamber.

3. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; a second valve chamber in the housing containing second valve means therein for controlling the flow of fluid therethrough and movable between an open and a closed position, said second valve means being responsive to the movement of the pressure responsive member; means yieldably biasing the first and second valve means toward the closed position; an auxiliary chamber in the housing and first and second ports leading thereto; a passage from the auxiliary chamber to said one side of the pressure responsive member; a check valve in said passageway permitting the flow of fluid from the auxiliary chamber to said one side of the pressure responsive member but preventing the reverse flow thereof; passage means between the second valve chamber and the auxiliary chamber; and valve means in the auxiliary chamber for controlling the fluid flow between the first port, the second port, and the passage means.

4. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; an inlet port in the housing; a passageway from the inlet port to said one side of the pressure responsive member; and a check valve in said passageway permitting the flow of fluid from the inlet port to said one side of the pressure responsive member but preventing the reverse flow thereof.

5. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; first and second inlet ports, and an outlet port in the housing; passage means interconnecting the first and second inlet ports and the outlet port; and second valve means in the passage means between the second inlet port and the outlet port for controlling fluid flow therebetween.

6. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; first and second inlet ports, and an outlet port in the housing; passage means interconnecting the first and second inlet ports and the outlet port; and second valve means in the passage means between the second inlet port and the outlet port responsive to the position of the pressure responsive member for controlling fluid flow between the second inlet port and the outlet port.

7. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; first and second inlet ports, and an outlet port in the housing; a passageway between the first inlet port and said one side of the pressure responsive member; a check valve in said passageway permitting the flow of fluid from the first inlet port to said one side of the pressure responsive member but preventing the reverse flow thereof; passage means interconnecting the first and second inlet ports and the outlet port; and second valve means in the passage means between the second inlet port and the outlet port for controlling fluid flow therebetween.

8. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; first and second inlet ports, and an outlet port in the housing; a passageway between the first inlet port and said one side of the pressure responsive member; a check valve in said passageway permitting the flow of fluid from the first inlet port to said one side of the pressure responsive member but preventing the reverse flow thereof; passage means interconnecting the first and second inlet ports and the outlet port; and second valve means in the passage means between the second inlet port and the outlet port responsive to the position of the pressure responsive member for controlling fluid flow between the second inlet port and the outlet port.

9. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; a second valve chamber in the housing containing second valve means therein for controlling the flow of fluid therethrough and movable between an open and a closed position, said second valve means being responsive to the movement of the pressure responsive member; means yieldably biasing the first and second valve means toward the closed position; an auxiliary chamber in the housing; first and second inlet ports into said auxiliary chamber; a passageway between the auxiliary chamber and one side of the second valve chamber; an outlet port in communication with the other side of the second valve chamber; and valve means in the auxiliary chamber for directing fluid flow between said last named passageway and either the first inlet port or the second inlet port, depending upon the position of the valve means.

10. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; a second valve chamber in the housing containing second valve means therein for controlling the flow of fluid therethrough and movable between an open and a closed position, said second valve means being responsive to the movement of the pressure responsive member; means yieldably biasing the first and second valve means toward the closed position; an auxiliary chamber in the housing; first and second inlet ports into said auxiliary chamber; a passageway between the first inlet port and said one side of the pressure responsive member; a check valve in said passageway permitting the flow of fluid from the first inlet port to said one side of the pressure responsive member but preventing the reverse flow thereof; a passageway between the auxiliary chamber and one side of the second valve chamber; an outlet port in communication with the other side of the second valve chamber; and valve means in the auxiliary chamber for directing fluid flow between said last named passageway and either the first inlet port or the second inlet port, depending upon the position of the valve means.

11. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; a second valve chamber in the housing containing second valve means therein for controlling the flow of fluid therethrough and movable between an open and a closed position, said second valve means being responsive to the movement of the pressure responsive member; means yieldably biasing the first and second valve means toward the closed position; an auxiliary chamber in the housing containing opposed valve seats and having openings associated with the valve seats; a first inlet port in communication with the auxiliary chamber through one opening, and a second inlet port in communication with the auxiliary chamber through the other opening; a passageway between the auxiliary chamber and one side of the second valve chamber; an outlet port in communication with the other side of the second valve chamber; and valve means in the auxiliary chamber movable between the opposed valve seats for closing off either the first inlet port or the second inlet port from the passageway to the second valve chamber.

12. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; a second valve chamber in the housing containing second valve means therein for controlling the flow of fluid therethrough and movable between an open and a closed position, said second valve means being responsive to the movement of the pressure responsive member; means yieldably biasing the first and second valve means toward the closed position; an auxiliary chamber in the housing containing opposed valve seats and having openings associated with the valve seats; a first inlet port in communication with the auxiliary chamber through one opening, and a second inlet port in communication with the auxiliary chamber through the other opening; a passageway between the first inlet port and said one side of the pressure responsive member; a check valve in said passageway permitting the flow of fluid from the first inlet port to said one side of the pressure responsive member but preventing the reverse flow thereof; a passageway between the auxiliary chamber and one side of the second valve chamber; an outlet port in communication with the other side of the second valve chamber; and valve means in the auxiliary chamber movable between the opposed valve seats for closing off either the first inlet port or the second inlet port from the passageway to the second valve chamber.

13. In an emergency break-away valve, the combination of a housing containing a diaphragm chamber with a diaphragm mounted therein; an inlet passageway connected to the diaphragm chamber and having a valve seat at the inner end thereof; yieldable means urging the diaphragm against the valve seat to prevent the entry of fluid into the diaphragm chamber through said passageway; an outlet passageway in communication with the diaphragm chamber; an inlet port in the housing; a passageway connecting the inlet port with the diaphragm chamber; and a check valve in said passageway permitting the flow of fluid from the inlet port to the diaphragm chamber but preventing the reverse flow thereof.

14. In an emergency break-away valve, the combination of a housing containing a diaphragm chamber with a diaphragm mounted therein; an inlet passageway connected to the diaphragm chamber and having a valve seat at the inner end thereof; yieldable means urging the diaphragm against the valve seat to prevent the entry of fluid into the diaphragm chamber through said passageway; an outlet passageway in communication with the diaphragm chamber; an inlet port in the housing; a passageway connecting the inlet port with the diaphragm chamber; a check valve in said passageway permitting the flow of fluid from the inlet port to the diaphragm chamber but preventing the reverse flow thereof; a valve chamber in the housing containing an inlet and an outlet; and valve means in said chamber for controlling the flow of fluid therethrough responsive to the position of the diaphragm.

15. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; a second valve chamber in the housing containing second valve means therein for controlling the flow of fluid therethrough and movable between an open and a closed position, said second valve means being responsive to the movement of the pressure responsive member; means yieldably biasing the first and second valve means toward the closed position; an auxiliary chamber in the housing; an inlet port into said chamber and an outlet port therefrom; a passageway connecting the auxiliary chamber with the second valve chamber; and valve means in the auxiliary chamber for directing fluid flow between the outlet port and either said last named passageway or the inlet port, depending on the position of the valve means.

16. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; a second valve chamber in the housing containing second valve means therein for controlling the flow of fluid therethrough and movable between an open and a closed position, said second valve means being responsive to the movement of the pressure responsive member; means yieldably biasing the first and second valve means toward the closed position; an auxiliary chamber in the housing; an inlet port into said chamber and an outlet port therefrom; a passageway between the inlet port and said one side of the pressure responsive member; a check valve in said passageway permitting the flow of fluid from the inlet port to said one side of the pressure responsive member but preventing the reverse flow thereof; a passageway connecting the auxiliary chamber with the second valve chamber; and valve means in the auxiliary chamber for directing fluid flow between the outlet port and either said last named passageway or the inlet port, depending on the position of the valve means.

17. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; a second valve chamber in the housing containing second valve means therein for controlling the flow of fluid therethrough and movable between an open and a closed position, said second valve means being responsive to the movement of the pressure responsive member; means yieldably biasing the first and second valve means toward the closed position; an auxiliary chamber in the housing containing opposed valve seats having openings associated therewith; a passageway from the second valve chamber to one of said openings; an inlet port in communication with the other opening; an outlet port in communication with the auxiliary chamber; and valve means in the auxiliary chamber movable between the opposed valve seats for closing off from communication with the outlet port, either the inlet port or the passageway to the second valve chamber.

18. In an emergency break-away valve, the combination of a housing containing a first valve chamber; an inlet into said chamber and an outlet therefrom; valve means for controlling the flow of fluid from said valve chamber including a pressure responsive member, said valve means being movable between an open and a closed position; a passage providing full communication between said chamber and one side of the pressure responsive member when said valve means is in the open position; a second valve chamber in the housing containing second valve means therein for controlling the flow of fluid therethrough and movable between an open and a closed position, said second valve means being responsive to the movement of the pressure responsive member; means yieldably biasing the first and second valve means toward the closed position; an auxiliary chamber in the housing containing opposed valve seats having openings associated therewith; a passageway from the second valve chamber to one of said openings; an inlet port in communication with the other opening; an outlet port in communication with the auxiliary chamber; valve means in the auxiliary chamber movable between the opposed valve seats for closing off from communication with the outlet port, either the inlet port or the passageway to the second valve chamber; a passageway between the auxiliary chamber and said one side of the pressure responsive member; and a check valve in said passageway permitting the flow of fluid from the auxiliary chamber to said one side of the pressure responsive member but preventing the reverse flow thereof.

References Cited in the file of this patent

UNITED STATES PATENTS

| | | |
|---|---|---|
| 1,614,652 | Christensen | Jan. 18, 1927 |
| 1,797,431 | Mathieson | Mar. 24, 1931 |
| 1,973,326 | Bessler | Sept. 11, 1934 |
| 2,084,707 | Robinson | June 22, 1937 |
| 2,368,852 | Lauck | Feb. 6, 1945 |
| 2,426,660 | Affleck | Sept. 2, 1947 |
| 2,491,812 | Hoffacher | Dec. 20, 1949 |
| 2,515,946 | Codman | July 18, 1950 |
| 2,667,887 | Hoffacher | Feb. 2, 1954 |